United States Patent
Fischer et al.

(10) Patent No.: US 10,914,946 B2
(45) Date of Patent: Feb. 9, 2021

(54) HEAD-UP DISPLAY SYSTEM

(71) Applicant: SAINT-GOBAIN GLASS FRANCE, Courbevoie (FR)

(72) Inventors: Klaus Fischer, Alsdorf (DE); Matthias Kuehne, Torgau (DE); Sandra Hornschuh, Torgau (DE); Roberto Zimmermann, Solingen (DE); Martin Henseler, Aachen (DE); Dagmar Schaefer, Herzogenrath (DE); Michael Jansen, Eschweiler (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 144 days.

(21) Appl. No.: 15/777,647

(22) PCT Filed: Mar. 20, 2017

(86) PCT No.: PCT/EP2017/056480
§ 371 (c)(1),
(2) Date: May 18, 2018

(87) PCT Pub. No.: WO2017/198363
PCT Pub. Date: Nov. 23, 2017

(65) Prior Publication Data
US 2018/0348513 A1 Dec. 6, 2018

(30) Foreign Application Priority Data
May 17, 2016 (EP) .................................... 16169824

(51) Int. Cl.
*G02B 27/01* (2006.01)
*C03C 17/36* (2006.01)
(Continued)

(52) U.S. Cl.
CPC .... *G02B 27/0101* (2013.01); *B32B 17/10036* (2013.01); *B32B 17/10229* (2013.01);
(Continued)

(58) Field of Classification Search
CPC ........ G02B 27/0101; G02B 2027/0118; G02B 2027/0194; G02B 1/115; G02B 5/23;
(Continued)

(56) References Cited

U.S. PATENT DOCUMENTS 5,999,314 A   12/1999  Asakura et al.
8,766,879 B2   7/2014  Fujikawa et al.
(Continued)

FOREIGN PATENT DOCUMENTS

CA    2076420 A1    2/1993
CN    104267499 A   1/2015
(Continued)

OTHER PUBLICATIONS

Japanese Office Action for Japanese Application 2018540820, dated Aug. 27, 2019. 4 pages. (English Translation Only).
(Continued)

*Primary Examiner* — Brandi N Thomas
(74) *Attorney, Agent, or Firm* — Pillsbury Winthrop Shaw Pittman LLP

(57) ABSTRACT

A head-up display system with an imaging unit for generating an image on a projection surface is described. The projection surface is provided for reflecting at least a part of the image. The projection surface includes a transparent screen having a transparent substrate and at least one electrically conductive coating with at least one functional layer on at least one surface of the transparent substrate.

14 Claims, 4 Drawing Sheets

Figure 1:
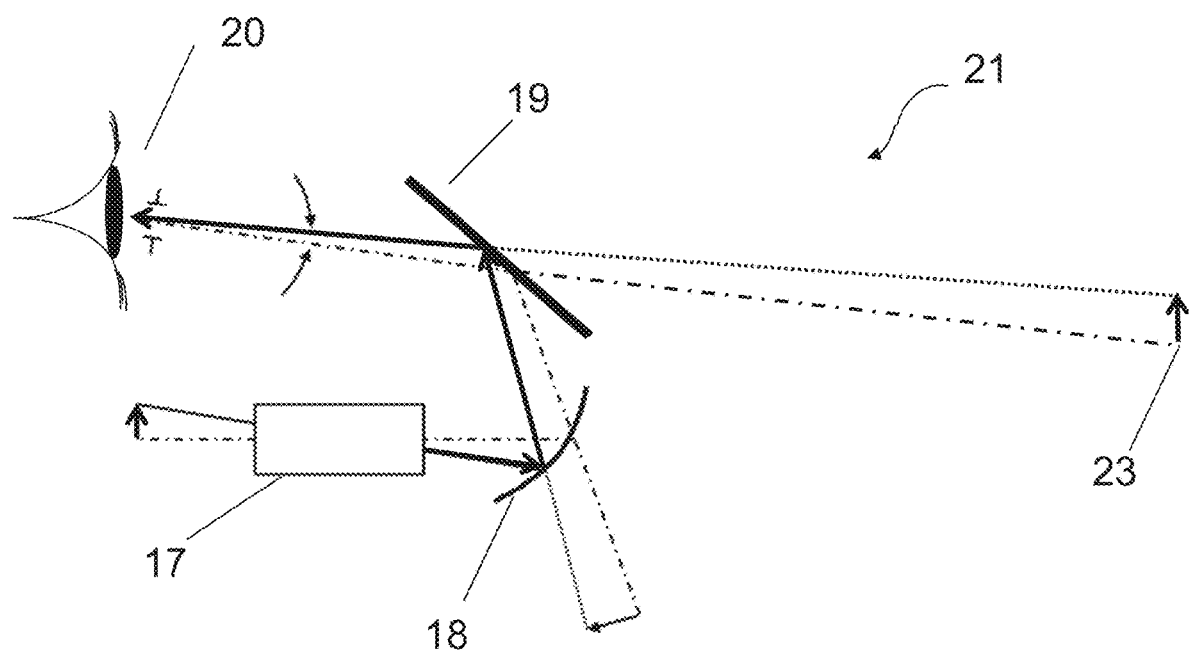

(51) Int. Cl.
*B32B 17/10* (2006.01)
*B60K 35/00* (2006.01)

(52) U.S. Cl.
CPC ........ *B32B 17/10761* (2013.01); *C03C 17/36* (2013.01); *C03C 17/366* (2013.01); *C03C 17/3618* (2013.01); *C03C 17/3626* (2013.01); *C03C 17/3639* (2013.01); *C03C 17/3644* (2013.01); *C03C 17/3652* (2013.01); *C03C 17/3655* (2013.01); *C03C 17/3663* (2013.01); *C03C 17/3673* (2013.01); *C03C 17/3681* (2013.01); *B60K 35/00* (2013.01); *B60K 2370/334* (2019.05); *G02B 2027/0118* (2013.01); *G02B 2027/0194* (2013.01)

(58) Field of Classification Search
CPC .... G02B 1/11; G02B 1/14; G02B 2027/0196; G02B 27/14; G02B 27/143; G02B 27/147; G02B 5/30; G02B 30/25; G02B 30/26; G02B 30/27; G02B 5/3016; G02B 1/105; G02B 1/08; G02B 27/283; G02B 3/0012; G02B 3/0087; G02B 5/1857; G02B 5/3025; G02B 5/3033; G02B 1/18; G02B 5/282; G02B 5/285; G02B 5/305; G02B 5/3058; G02B 5/3083; G01N 21/6452; G01N 35/028; G01N 21/274; G01N 2035/0405; G01N 2035/00366; G01N 2035/0425; G01N 35/1074; G01N 35/0099; G01N 21/553; G01N 21/648; G01N 2035/00287; G01N 2035/1039; G01N 21/6486; G01N 35/1002; G01N 2035/00356; G01N 21/253; G01N 2035/00148; G01N 2035/1037; G01N 21/6428; G01N 2021/212; G01N 21/21; G01N 21/41; G01N 21/45; G01N 21/552; G01N 33/68; G01N 33/6854; G01N 2035/042; G01N 21/27; G01N 21/3563; G01N 21/55; G01N 21/64; G01N 21/8422; G01N 21/9501; G01N 2035/1034; G01N 33/50; G01N 35/04; G01N 35/1016; G02F 1/133371; G02F 1/29; G02F 2203/28; G02F 1/134363; G02F 2001/133334; G02F 2001/136218; G02F 2202/28; G02F 1/132; G02F 1/133528; G02F 1/133608; G02F 1/13362

USPC ......... 359/619–621, 630–633, 290–292, 298
See application file for complete search history.

(56) References Cited

U.S. PATENT DOCUMENTS

| | | | |
|---|---|---|---|
| 2004/0135742 A1* | 7/2004 | Weber | G02B 5/305 |
| | | | 345/7 |
| 2009/0303604 A1 | 12/2009 | Martin | |
| 2012/0177900 A1 | 7/2012 | Laurent et al. | |
| 2014/0017472 A1 | 1/2014 | Coster et al. | |
| 2014/0198389 A1 | 7/2014 | Laurent et al. | |
| 2014/0319116 A1* | 10/2014 | Fischer | H05B 3/84 |
| | | | 219/203 |
| 2015/0004383 A1 | 1/2015 | Sandre-Chardonnal | |
| 2016/0370586 A1* | 12/2016 | Saenger Nayver | G02B 5/23 |

FOREIGN PATENT DOCUMENTS

| | | |
|---|---|---|
| DE | 4227582 A1 | 2/1993 |
| DE | 102011075887 A1 | 11/2012 |
| EP | 2131227 A2 | 12/2009 |
| EP | 1 923 365 B1 | 10/2011 |
| JP | H10148787 A | 6/1998 |
| JP | 2014504583 A | 2/2014 |
| JP | 2015507600 A | 3/2015 |
| RU | 2179537 C2 | 2/2002 |
| WO | WO 01/027050 A1 | 4/2001 |
| WO | WO 03/024155 A2 | 3/2003 |
| WO | 2011020974 A1 | 2/2011 |
| WO | 2012052315 A1 | 4/2012 |
| WO | WO 2012/052315 A1 | 4/2012 |
| WO | 2012140098 A1 | 10/2012 |
| WO | WO 2013/104439 A1 | 7/2013 |
| WO | WO 2013/107983 A1 | 7/2013 |

OTHER PUBLICATIONS

Canadian Office Action for 3,014,263 on behalf of Saint-Gobain Glass France, dated Mar. 4, 2019. 4 pages.
Written Opinion for International Application No. PCT/EP2017/056480 filed Mar. 20, 2017 on behalf of Saint-Gobain Glass France, dated Jun. 28, 2017. 12 pages (English + German).
International Search Report for International Application No. PCT/EP2017/056480 filed Mar. 20, 2017 on behalf of Saint-Gobain Glass France, dated Jun. 28, 2017. 7 pages. (German + English Translation).

* cited by examiner

HEAD-UP DISPLAY SYSTEM

CROSS REFERENCE TO RELATED APPLICATIONS

The present application is the US national stage of International Patent Application No. PCT/EP2017/056480 filed on Mar. 20, 2017, which, in turn, claims priority to European Patent Application No. 16169824.6 filed on May 17, 2016.

The invention relates to a head-up display system comprising an imaging unit for generating an image and a projection surface. The invention further relates to a motor vehicle with a head-up display system, a method for generating an image on a projection surface using a head-up display system, and a use of the head-up system.

High demands are made on motor vehicle glazing. The following legal regulations apply with regard to the size of the field of vision and the structural stability of the panes:

ECE R 43: "Einheitliche Vorschriften für die Genehmigung des Sicherheitsglases and der Verbundglaswerkstoffe [Uniform Provisions Concerning the Approval of Safety Glazing and Composite Glazing Materials]" as well as Technische Anforderungen an Fahrzeugteile bei der Bauartprüfung [Technical requirements for vehicle parts for type testing] § 22 a StVZO [German road vehicle code], "Safety Glass".

These regulations are usually met by composite glass panes. Composite glass panes consist of two or more individual panes, in particular made of float glass and are fixedly bonded to one another with one or a plurality of intermediate layers with heat and pressure. The intermediate layers are usually made of thermoplastic plastics such as polyvinyl butyral (PVB) or ethylene vinyl acetate (EVA).

The pane can have an electrical heating function, based on transparent, electrical coatings. Such electrically conductive coatings can have a plurality of metallic and dielectric thin layers. Coatings based on thin silver layers are economically producible and resistant to aging. The layers usually have sheet resistances in the range from 3 ohm/square to 5 ohm/square.

In addition, vehicles can be equipped with so-called "head-up display" (HUD) technology. A head-up display is a display system that projects additional information for the driver of the vehicle in his field of vision in the form of images. The head-up display system comprises an imaging unit and multiple optics modules for deflecting or mirroring (reflecting) an image onto a projection surface or reflection surface. Customarily, a composite pane, in particular the windshield of the vehicle, serves as the projection surface. Although the image is projected onto the windshield, it floats, as perceived by the human eye of the driver, at a distance above the hood of the vehicle.

Customarily, the image generated by the imaging unit consists of polarized light. The s-polarized light strikes the composite pane at a specific angle of incidence and is at least partially both refracted into the composite pane and reflected as s-polarized light into the field of vision of the driver. However, the reflected images are not color neutral or have unwanted reflection, so-called double images.

DE102011075887A1 discloses a head-up display with an image forming unit that includes a backlighting unit and a liquid crystal display unit, which is actuated for generating visible images by the drive unit and is illuminated by the light of the backlighting unit.

The object of the present invention consists in providing a head-up display system that improves the projection of images.

The object of the present invention is accomplished according to the invention by a head-up display system with an imaging unit for generating an image and a projection surface in accordance with claim 1 the disclosure. Preferred embodiments emerge from the disclosure. A motor vehicle with a head-up display system and a method for generating an image on a projection surface using a head-up display system emerge from the disclosure.

The head-up display system according to the invention includes an imaging unit for generating an image on a projection surface, wherein the projection surface is provided for reflecting at least part of the image and includes a transparent pane with a transparent substrate and at least one electrically conductive coating with at least one functional layer on at least one surface of the transparent substrate.

In a preferred embodiment of the head-up display system according to the invention, provision is advantageously made for the imaging unit to emit s-polarized light, which is deflected by the optics module and reflected on the projection surface in the direction of a vehicle driver. The projection surface can be a windshield of a vehicle. Such projection surfaces reflect the image generated by the imaging unit such that they can also be referred to as reflection surfaces.

In another embodiment of the head-up display system according to the invention, the light deflected by the optics module strikes the projection surface with an angle of incidence of approx. 55° to 70°, preferably 65°. Alternatively, the light emitted by the imaging unit can fall directly on the projection surface with an angle of incidence of approx. 55° to 70°.

It is possible for the electrically conductive coating to have a plurality of functional layers arranged one atop another. For example, four functional layers can be arranged one atop another. The inventors found surprisingly that particularly good results in terms of color neutrality are obtained with four functional layers.

Preferably, each functional layer can include at least one electrically conductive layer. Each electrically conductive layer can have the same layer thickness. Alternatively, the electrically conductive layer can have a layer thickness that is one half the layer thickness of a second electrically conductive layer.

In an advantageous embodiment of the invention, the functional layer can comprise at least a layer of optically highly refractive material with a refractive index ≥1.3, above the layer of optically highly refractive material, a first matching layer, above the first matching layer, an electrically conductive layer, and above the electrically conductive layer, a second matching layer.

The layer thickness of one of the electrically conductive layers can, in each case, be from 5 nm to 25 nm and the total layer thickness of all electrically conductive layers can be from 20 nm to 100 nm. At least one layer of optically highly refractive material arranged between two electrically conductive layers can include a layer of a dielectric material with a refractive index less than or equal to 2.1 and a layer of an optically highly refractive material with a refractive index greater than or equal to 2.1.

If a first layer is arranged above a second layer, this means, in the context of the present invention, that the first layer is arranged farther from the substrate on which the layers are applied than the second layer.

If a first layer is arranged below a second layer, this means, in the context of the present invention, that the second layer is arranged farther from the substrate on which the layers are applied than the first layer.

The total layer thickness of all electrically conductive layers of the entire electrically conductive coating is, according to the invention, from 20 nm to 100 nm. In this advantageous range for the total thickness of all silver-containing layers, with typical distances h between two busbars, and an operating voltage U from 12 V to 15 V, adequately high heating power P and adequately high transmittance are advantageously obtained.

Each functional layer of the electrically conductive coating according to the invention has, arranged between two electrically conductive layers, at least one layer of optically highly refractive material which includes a layer of a dielectric material with a refractive index less than or equal to 2.1 and a layer of an optically highly refractive material with a refractive index greater than or equal to 2.1.

It has surprisingly been found that such a coating results in high color neutrality and desired transmittance of light, by keeping the reflection of the image on the coating itself as small as possible and color neutral.

A layer of optically highly refractive material lies, in the context of the invention, between two electrically conductive layers when at least one electrically conductive layer is arranged above the layer of optically highly refractive material and when an electrically conductive layer is arranged below the layer of optically highly refractive material. This arrangement, however, does not require direct contact between the electrically conductive layer and the layer of optically highly refractive material.

In the context of the invention, a layer can be made of one material. A layer can, however, also include two or more individual layers made of different materials. A functional layer according to the invention includes, for example, at least one layer of optically highly refractive material, a first and a second matching layer, and an electrically conductive layer.

Preferably, the first and/or the second matching layer can include a zinc oxide.

A preferred embodiment of the invention provides that the thickness of the layer of optically highly refractive material can be 10 nm to 100 nm, with a layer of optically highly refractive material, having at least a thickness of 20 nm, arranged between two electrically conductive layers. Furthermore, the layer of highly refractive material can have a refractive index greater than or equal to 1.9 and/or contain at least silicon nitride or mixed silicon/metal nitride, such as SiZrN, and mixtures thereof.

In a particularly preferred embodiment of the transparent pane according to the invention, the layer of optically highly refractive material includes a mixed silicon/zirconium nitride. The mixed silicon/zirconium nitride is preferably deposited with a target that contains from 40 wt.-% to 70 wt.-% silicon, from 30 wt.-% to 60 wt.-% zirconium as well as production-related admixtures. The target particularly preferably contains from 45 wt.-% to 60 wt.-% silicon, from 40 wt.-% to 55 wt.-% zirconium as well as production-related admixtures. The deposition of the mixed silicon/zirconium nitride is done under addition of nitrogen as reaction gas during the cathodic sputtering.

Another preferred embodiment of the transparent pane according to the invention provides a smoothing layer that can be arranged at least between two electrically conductive layers, in particular below one of the first matching layers. The smoothing layer can contain a mixed tin/zinc oxide. An electrically conductive layer deposited on a smoother surface has a higher degree of transmittance with a simultaneously lower sheet resistance. This effect is the more favorable, the thinner the electrically conductive layer.

In another preferred embodiment of the transparent pane according to the invention, another layer of optically highly refractive material with a refractive index ≥1.9 is provided above the uppermost functional layer. This layer can contain silicon nitride as an optically highly refractive material. The use of silicon nitride protects the layers arranged thereunder against corrosion, matches the optical properties of the functional layers to those of the intermediate layer, and is particularly economical.

In a particularly preferred embodiment of the transparent pane according to the invention, the electrically conductive layer has at least silver or a silver-containing alloy. The silver-containing layers contain at least 90 wt.-% silver, preferably 99.9 wt.-%. The silver-containing layers are applied with conventional methods for layer deposition of metals, for example, by vacuum methods such as magnetron-enhanced cathodic sputtering.

The layer thicknesses of the matching layer, of the smoothing layer, of the layer of optically highly refractive material, and of the silver-containing layer with the desired properties in terms of transmittance, sheet resistance, and color values, are apparent to the person skilled in the art in a simple manner through simulations in the range of the above indicated layer thicknesses.

In an advantageous embodiment of the transparent pane according to the invention, the electrically heatable coating extends to at least 50%, preferably to at least 70%, and particularly preferably to at least 90% of the area of the side of the pane on which it is applied.

Moreover, it is preferred that at least one functional layer has a blocker layer adjacent the electrically conductive layer and that the blocker layer preferably contains at least nickel, chromium, or alloys thereof. The blocker layer can have a thickness from 0.1 nm to 5 nm. The blocker layer between the second matching layer and the silver-containing layer prevents contact of the sensitive silver-containing layer with the oxidizing reactive atmosphere during the deposition of the following layer made of zinc oxide by reactive cathodic sputtering.

The matching layer, the smoothing layer, the layer of optically highly refractive material, the blocker layer, and the silver-containing layer are deposited by methods known per se, for example, by magnetron-enhanced cathodic sputtering. The cathodic sputtering is done in a protective gas atmosphere, for example, of argon, or in a reactive gas atmosphere, for example, through addition of oxygen or nitrogen.

The transparent substrate can be bonded to a second pane via a thermoplastic intermediate layer to form a composite pane and have a total transmittance greater than 70%. The term "total transmittance" is based on the process for testing the light permeability of motor vehicle windows specified by ECE-R 43, Annex 3, § 9.1. The composite pane and/or the intermediate layer can have a wedge-shaped cross-section. The wedge-shaped cross-section has the effect that with a reflection, the creation of additional, undesirable ghost images is reduced. The composite pane is configured such that s-polarized light is reflected amplified.

The electrically heatable coating preferably extends over the entire surface of the side of the pane on which it is applied, minus a peripheral frame-like de-coated region with a width of 2 mm to 20 mm, preferably from 5 mm to 10 mm. This serves for electrical insulation between the voltage-carrying coating and the vehicle body. The de-coated region is preferably hermetically sealed by the intermediate layer or by an acrylate adhesive as a vapor diffusion barrier. The corrosion-sensitive coating is protected against moisture and atmospheric oxygen by the vapor diffusion barrier. Additionally, the electrically heatable coating can be de-coated in another region, which serves, for example, as a data transmission window or a communication window. The transparente pane is permeable to electromagnetic and, in particular, infrared radiation in the other de-coated region.

In a preferred embodiment of the transparent pane according to the invention, the electrically heatable coating is connected to a voltage source via busbars and a voltage applied on the electrically heatable coating has a value of 12 V to 15 V.

The transparent, electrically conductive coating is connected to busbars for transferring electrical power.

The busbars are advantageously produced by printing a conductive paste that is fired before the bending and/or at the time of the bending of the glass pane. The conductive paste preferably contains silver particles and glass frits. The layer thickness of the fired silver paste is preferably from 5 μm to 20 μm.

In an alternative embodiment of the busbars, thin and narrow metal foil strips or metal wires that preferably contain copper and/or aluminum are used; in particular, copper foil strips with a thickness of approx. 50 μm are used. The width of the copper foil strips is preferably 1 mm to 10 mm. The metal foil strips or metal wires are placed on the coating during assembly of the composite layers. In the subsequent autoclave process, a more reliable electrical contact between the busbars and the coating is achieved through the action of heat and pressure. The electrical contact between the coating and the busbars can alternatively be established by soldering or by gluing with an electrically conductive adhesive.

In the automotive sector, foil conductors are customarily used as feed lines for contacting busbars in the interior of composite panes. Flexible foil conductors, sometimes also called "flat conductors" or "flat-band conductors", are preferably made of a tinned copper strip with a thickness from 0.03 mm to 0.1 mm and a width from 2 mm to 16 mm. Copper has proven successful for such conductor tracks since it has good electrical conductivity as well as good processability into foils. At the same time, material costs are low. Other electrically conductive materials that can be processed into foils can also be used. Examples for this are aluminum, gold, silver, or tin and alloys thereof.

For electrical insulation and for stabilization, the tinned copper strip is applied on a carrier material made of plastic or laminated therewith on both sides. The insulation material contains, as a rule, a 0.025-mm- to 0.05-mm-thick polyimide-based film. Other plastics or materials with the required insulating properties can also be used. A plurality of conductive layers electrically isolated from each other can be situated in one foil conductor strip.

Foil conductors that are suitable for the contacting of electrically conductive layers in composite panes have a total thickness of only 0.3 mm. Such thin foil conductors can be embedded without difficulty in the thermoplastic adhesive layer between the individual panes.

Alternatively, thin metal wires can also be used as feed lines. The metal wires contain, in particular, copper, tungsten, gold, silver, or aluminum or alloys of at least two of these metals. The alloys can also contain molybdenum, rhenium, osmium, iridium, palladium, or platinum.

In a preferred embodiment of the transparent pane according to the invention, the electrically heatable coating has a heating power from 500 W/m$^2$ to 700 W/m$^2$.

The invention also includes a motor vehicle with a head-up display system according to the invention.

The invention further relates to a method for generating an image on a projection surface using a head-up display systems, wherein a transparent pane comprising a transparent substrate and at least one electrically conductive coating with a functional layer on at least one surface of the transparent substrate is used as a projection surface.

The individual layers are deposited by methods known per se, for example, by magnetron-enhanced cathodic sputtering. The cathodic sputtering is done in a protective gas atmosphere, for example, of argon, or in a reactive gas atmosphere, for example, through addition of oxygen or nitrogen.

The layer thicknesses of the individual layers with the desired properties in terms of transmittance, sheet resistance, and color values emerge for the person skilled in the art through simulations in the range of the above indicated layer thicknesses.

In an advantageous embodiment of the invention, the transparent substrate and a second pane are heated to a temperature from 500° C. to 700° C., and the transparent substrate and the second pane are bonded congruently to a thermoplastic intermediate layer. The heating of the pane can take place within a bending process. The electrically conductive coating must, in particular, be suited to withstand the bending process and/or the laminating process without damage. The properties, in particular, the sheet resistance of the above described electrically conductive coating, are regularly improved by heating.

The electrically conductive coating can be connected to at least two busbars before the heating of the substrate.

The invention further includes the use of the head-up display system according to the invention in vehicles, in particular in motor vehicles.

In the following, the invention is explained in detail with reference to drawings and an example. The drawings are a schematic representation and are not true to scale. The drawings in no way restrict the invention.

Figure 2:
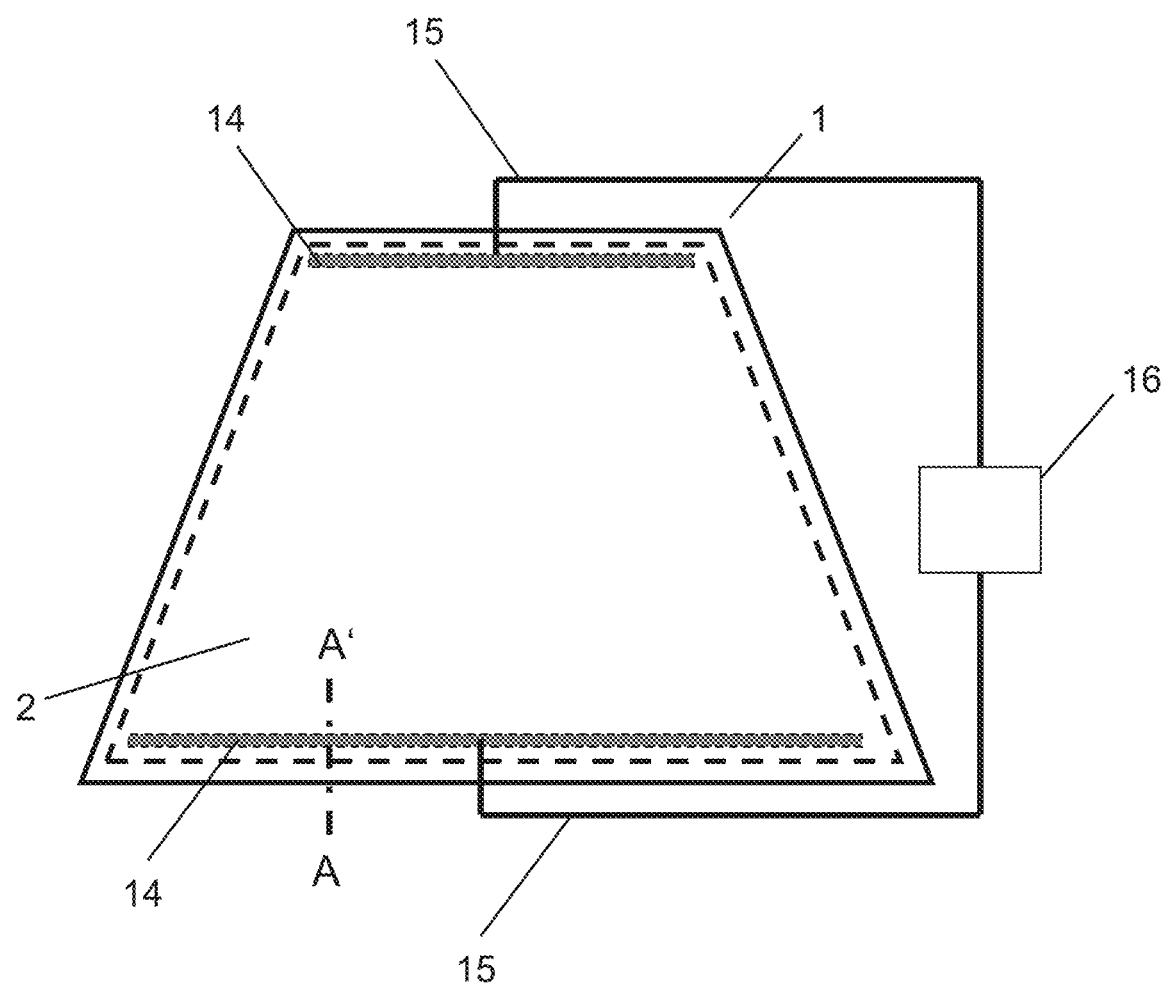
Figure 3:
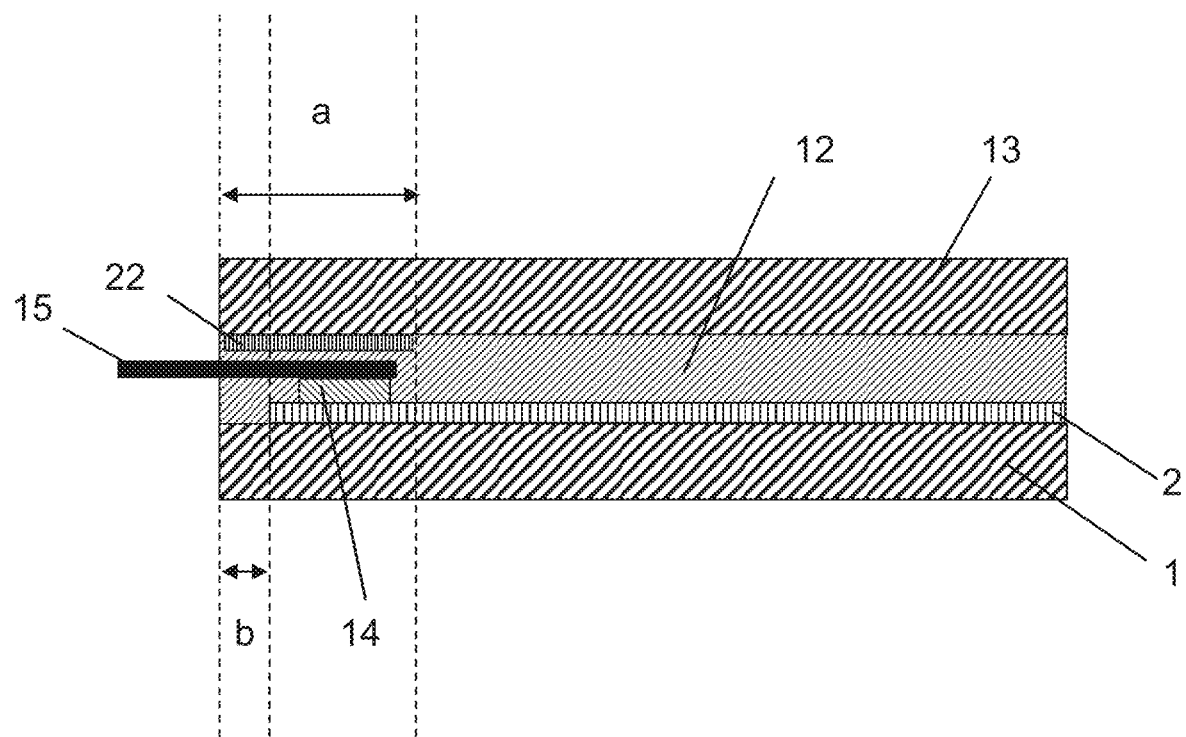

They depict:

FIG. 1 schematic side view of a beam path of a head-up display system according to the invention having a composite pane FIG. 2 a plan view of a transparent pane according to the invention as part of a composite pane, and FIG. 3 a cross-sectional drawing alone the section line A-A' of FIG. 2

Figure 4:
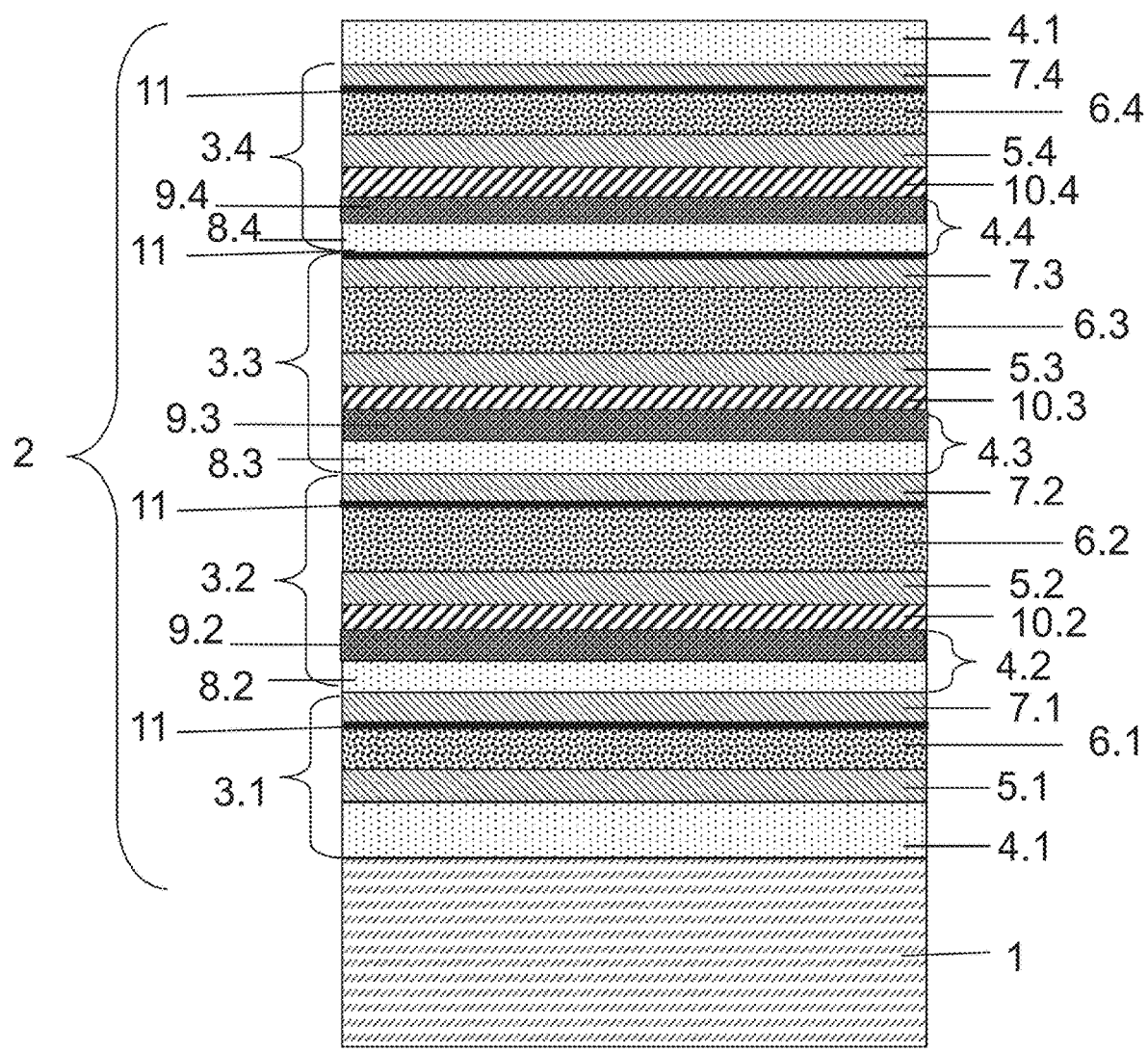

FIG. 4 a cross-section through an embodiment of the transparent pane having an electrically conductive coating.

FIG. 1 depicts a head-up display system 21 according to the invention having a transparent pane as part of a composite pane 19. The composite pane 19 is provided as a windshield of a passenger car. The head-up display system 21 comprises an imaging unit 17, an optics module 18, and the composite pane 19 as a projection surface of the head-up display system 21.

The imaging unit 17 is a TFT-projector or an LCD display that is provided for generating an image. The optics module 18 is provided for deflecting the image generated by the imaging unit 17 and can be implemented as a mirror or a so-called "combiner". The composite pane 19 has the transparent pane with an electrically conductive coating 2 and serves as a projection surface of the deflected image.

A driver 20 of a car sits in the interior of the car that is equipped with the head-up display system 21 according to the invention. The head-up display system 21 projects a virtual image 23 into the field of vision of the driver, in that the imaging unit 17 generates an image and deflects the image by the optics module 18 onto the composite pane 19.

Polarized light can be broken down into two linearly polarized components perpendicular to one another. The perpendicular or parallel linear polarized component is also referred to as s-polarization or p-polarization, respectively.

The image generated by the imaging unit 17 has s-polarized light (perpendicular polarization in the plane of incidence). The s-polarized light deflected by the optics module strikes the composite pane with an angle of incidence of approx. 65°. The s-polarized light is reflected in the direction of the driver on the boundary surfaces of the composite pane 19 with the air. The composite pane 19 reflects the s-polarized light significantly stronger than p-polarized light (parallel polarization in the plane of incidence).

The inner side of the composite pane facing the vehicle interior forms an inner boundary surface with the air in the interior of the car and the outer side of the composite pane 19 facing outward forms an outer boundary surface with the air surrounding the car. The composite pane 19 has a wedge-shaped cross-section such that the light is reflected such that the images reflected on the two boundary surfaces yield a single virtual image 23 in the eye of the driver.

The virtuelle image 23 appears in the driver's eye as a sharp, well recognizable, and true color image. In the perception of the human eye of the driver, the projected, virtual image 23 floats, at a distance, above the hood of the car.

FIG. 2 and FIG. 3 depict in each case a detail of the transparent pane as part of the composite pane. The transparent substrate 1 is bonded to a second pane 13 via a thermoplastic intermediate layer 12. FIG. 2 depicts a plan view of the surface of the transparent substrate 1 facing away from the thermoplastic intermediate layer. The transparent substrate 1 is the pane facing the interior of the car. The transparent substrate 1 and the second pane 13 contain float glass and have a thickness of 2.1 mm in each case. The thermoplastic intermediate layer 12 contains polyvinyl butyral (PVB) and has a thickness of 0.76 mm.

The electrically conductive coating 2 is applied on the surface of the transparent substrate 1 facing the thermoplastic intermediate layer 12. The electrically conductive coating 2 is an electrically heatable coating with corresponding electrical contacting. The electrically conductive coating 2 extends over the entire surface of the transparent substrate 1, minus a peripheral frame-like coating-free region with a width b of approx. 8 mm. The coating-free region serves for the electrical insulation between the voltage-carrying electrical coating 2 and the vehicle body. The coating-free region is hermetically sealed by gluing with the intermediate layer 12, in order to protect the electrically conductive coating 2 against damage and corrosion.

A busbar 14 is arranged in each case on the outer upper and lower edge of the transparent substrate 1 for the electrical contacting of the electrically conductive coating 2. The busbars 14 were printed on the electrically conductive coating 2 using a conductive silver paste and fired. The layer thickness of the fired silver paste is 15 μm. The busbars 14 are electrically conductively connected to the underlying areas of the electrically conductive coating 2.

The busbar 14 is in each case soldered to a feed line 15. The feed lines 15 are made of tinned copper foils with a width of 10 mm and a thickness of 0.3 mm. The electrically heatable coating 2 is connected to a voltage source 16 via the busbars 14 and the feed lines 15. The voltage source 16 is, for example, the 14 V, 24 V or 40 V on-board voltage of a motor vehicle.

On the second pane 13, an opaque color layer with a width a of 20 mm is applied frame-like on the edge of the surface facing the thermoplastic intermediate layer 12 as a masking print 22. The masking print 22 obscures the view of the adhesive strand with which the transparent pane is glued into the vehicle body. The masking print 22 serves simultaneously as protection of the adhesive against UV radiation and thus as protection against premature aging of the adhesive. Furthermore, the busbars 14 and the feed lines 15 are obscured by the masking print 22.

FIG. 4 depicts a cross-section through an embodiment of the transparent pane according to the invention with the transparent substrate 1 and the electrically conductive coating 2.

The electrically heatable coating 2 comprises four functional layers 3 (3.1, 3.2, 3.3, and 3.4) that are arranged congruently one atop another. Each functional layer 3 comprises
a layer of optically highly refractive material 4 (4.1, 4.2, 4.3, and 4.4) that contains silicon nitride (Si3N4),
a first matching layer 5 (5.1, 5.2, 5.3, and 5.4) that contains zinc oxide (ZnO),
an electrically conductive layer 6 (6.1, 6.2, 6.3, 6.4) that contains silver or a silver-containing alloy,
a second matching layer 10 (10.1, 10.2, 10.3, and 10.4) that contains zinc oxide (ZnO).

The layers are arranged in the order indicated with increasing distance from the substrate 1. Above the uppermost functional layer 3.4, another layer 4.1 of optically highly refractive material with a refractive index 1.9 to 2.1 is provided. This other layer and the bottommost layer of the coating 2 contain in each case silicon nitride ($Si_3N_4$) as an optically highly refractive material with a layer thicknesses from 10 nm to 50 nm. The use of silicon nitride as a cover layer protects the layers arranged thereunder.

The first matching layer 5 and the second matching layers 7 contain zinc oxide (ZnO) with a refractive index 1.8 to 2.0 and have layer thicknesses from 2 nm to 20 nm, preferably 5-10 nm.

Each functional layer 3 of the electrically conductive coating 2 has a layer 4.2, 4.3, 4.4 of optically highly refractive material arranged between two electrically conductive layers 6, which comprises a layer 8.2, 8.3, 8.4 of a dielectric material with a refractive index 1.9 to 2.1 and a layer 9.2, 9.3, 9.4 of an optically highly refractive material with a refractive index 2.1 to 2.3.

The layer 8.2, 8.3, 8.4 of a dielectric material with a refractive index less than or equal to 2.1 contains silicon nitride and has a layer thickness from 10 nm to 50 nm, in particular 20 nm to 40 nm.

The layer 9.2, 9.3, 9.4 of an optically highly refractive material with a refractive index greater than or equal to 2.1 contains mixed silicon/zirconium nitride (SiZrNx) and has layer thicknesses from 10 nm to 50 nm, particularly preferably 15 nm to 30 nm.

The electrically conductive layers 6 (6.1, 6.2, 6.3, 6.4) contain silver and have layer thicknesses from 5 nm to 25 nm. Particularly preferred are layer thicknesses from 11 nm to 18 nm. The total layer thickness of all electrically conductive layers 6 is 57 nm. Here, the silver distribution should be approx. 20% in (6.1)/approx. 30% in (6.2) and in each case approx. 25% in (6.3) and (6.4) in order to achieve a color neutral (white) reflection on the coating itself under the conditions mentioned (65°/s-polarization).

A blocker layer 11 is arranged between each electrically conductive layer 6 (6.1, 6.2, 6.3, 6.4) and the second matching layer 7 arranged thereabove. The blocker layer 11 consists, for example, of a 0.2-nm- to 0.4-nm-thick layer, which contains nickel, chromium, or alloys thereof and was deposited by magnetron-enhanced cathodic sputtering.

Between two electrically conductive layers 6, provided in each case is a smoothing layer 10.2, 10.3, 10.4, which is in each case arranged below one of the first matching layers 5.2, 5.3, 5.4. The smoothing layers 10.2, 10.3, 10.4 contain mixed zinc/tin oxide (ZnSnO) and have layer thicknesses from 2-20 nm, preferably 5-10 nm.

The exact layer sequence with layer thicknesses is presented in Table 1.

TABLE 1

|  | Reference Characters | Reference Characters | Layer Thickness |
|---|---|---|---|
| Si3N4 |  | 4.1 | 20 nm-40 nm |
| ZnO |  | 10.4 | 3.4 | 5 nm-10 nm |
| NiCr |  | 11 |  | 0.2-0.4 nm |
| Ag |  | 6.4 |  | 14 nm |
| ZnO |  | 5.4 |  | 5 nm-10 nm |
| ZnSnO |  | 10.4 |  | 5 nm-10 nm |
| SiZrN | 9.4 | 4.4 |  | 15 nm-30 nm |
| Si3N4 | 8.4 |  |  | 20 nm-40 nm |
| ZnO |  | 10.3 | 3.3 | 5 nm-10 nm |
| NiCr |  | 11 |  | 0.2-0.4 nm |
| Ag |  | 6.3 |  | 14 nm |
| ZnO |  | 5.3 |  | 5 nm-10 nm |
| ZnSnO |  | 10.3 |  | 5 nm-10 nm |
| SiZrN | 9.3 | 4.3 |  | 15 nm-30 nm |
| Si3N4 | 8.3 |  |  | 20 nm-40 nm |
| ZnO |  | 7.2 | 3.2 | 5 nm-10 nm |
| NiCr |  | 11 |  | 0.2-0.4 nm |
| Ag |  | 6.2 |  | 17 nm |
| ZnO |  | 5.2 |  | 5 nm-10 nm |
| ZnSnO |  | 10.2 |  | 5 nm-10 nm |
| SiZrN | 9.2 | 4.2 |  | 15 nm-30 nm |
| Si3N4 | 8.2 |  |  | 20 nm-40 nm |
| ZnO |  | 7.1 | 3.1 | 5 nm-10 nm |
| NiCr |  | 11 |  | 0.2 nm-0.4 nm |
| Ag |  | 6.1 |  | 12 nm |
| ZnO |  | 5.1 |  | 5 nm-10 nm |
| Si3N4 |  | 4.1 |  | 20 nm-40 nm |
| Glass as substrate |  | 1 |  | 2.1 mm |

The layer of optically highly refractive material 4, the smoothing layer 10, the matching layer 5 and 7, and the electrically conductive layer 6 were deposited by cathode-ray sputtering. The target for the deposition of the matching layer 5 and 7 contained 92 wt.-% zinc oxide (ZnO). The target for the deposition of the smoothing layer 10 contained 68 wt.-% tin, 30 wt.-% zinc. The target for the deposition of the layer of optically highly refractive material 4 contained 52.9 wt.-% silicon, 43.8 wt.-% zirconium. The deposition of the smoothing layer 10 was done under addition of oxygen as reaction gas during the cathodic sputtering. The deposition of the layer of optically highly refractive material 4 was done under addition of nitrogen as reaction gas during the cathodic sputtering.

REFERENCE CHARACTERS (1) transparent substrate
(2) electrically conductive coating
(3), (3.1), (3.2), (3.3), (3.4) functional layers
(4), (4.1), (4.2), (4.3), (4.4) a layer of optically highly refractive material
(5), (5.1), (5.2), (5.3), (5.4) first matching layer
(6), (6.1), (6.2), (6.3), (6.4) electrically conductive layer
(7), (7.1), (7.2), (7.3), (7.4) second matching layer
(8) layer of a dielectric material with a refractive index ≤2.1
(9) layer of optically highly refractive material of a dielectric material with a refractive index≥2.1
(10), (10.2), (10.3), (10.4) smoothing layer
(11) blocker layer
(12) intermediate layer
(13) second pane
(14) busbar
(15) feed line
(16) voltage source
(17) imaging unit
(18) optics module
(19) composite pane
(20) eye of a car driver
(21) head-up display system
(22) masking print
(23) image
a width of the region masked by masking print (22)
b width of the edge deletion
A-A' section line

The invention claimed is:

1. A head-up display system comprising:
an imaging unit for generating an image on a projection surface, the imaging unit constructed and arranged to emit s-polarized light,
wherein the projection surface is provided for reflecting at least a part of the image,
wherein the projection surface comprises a transparent pane having a transparent substrate and at least one electrically conductive coating with at least one functional layer on at least one surface of the transparent substrate,
wherein each functional layer comprises
a layer of optically highly refractive material with a refractive index ≥1.3,
above the layer of optically highly refractive material, a first matching layer,
above the first matching layer, an electrically conductive layer,
above the electrically conductive layer, a second matching layer, and
wherein the composite pane is constructed and arranged to reflect more s-polarized light than p-polarized light into a field of view of a driver of a vehicle in which the head-up display is equipped.

2. The head-up display system according to claim 1, wherein the electrically conductive coating has at least four functional layers arranged one atop another wherein each functional layer includes at least one electrically conductive layer containing at least silver or a silver-containing alloy.

3. The head-up display system according to claim 2, wherein each electrically conductive layer has the same layer thickness.

4. The head-up display system according to claim 2, wherein one electrically conductive layer has a layer thickness that is half as thick as the layer thickness of a second electrically conductive layer.

5. The head-up display system according to claim 1, wherein the transparent substrate is joined to a second pane via at least one thermoplastic intermediate layer to form a composite pane.

6. The head-up display system according to claim 4, wherein the composite pane is provided for reflecting s-polarized light.

7. The head-up display system according to claim 6, wherein at least one layer of optically highly refractive material arranged between two electrically conductive layers comprises
a layer of a dielectric material with a refractive index less than or equal to 2.1, and
a layer of optically highly refractive material with a refractive index greater than or equal to 2.1.

8. The head-up display system according to claim 1, wherein the layer of optically highly refractive material includes at least silicon nitride.

9. The head-up display system according to claim 1, wherein the layer of optically highly refractive material arranged between two electrically conductive layers includes mixed silicon/zirconium nitride.

10. A motor vehicle, comprising: a head-up display system according to claim 1.

11. A method for generating an image on a projection surface, comprising:
providing a head-up display system according to claim 1; and
using the head-up display system as the projection surface.

12. A method, comprising:
providing the head-up display system according to claim 1; and using the head-up display system in a vehicle.

13. The method of claim 12, wherein the vehicle is a motor vehicle.

14. The head-up display system according to claim 2, wherein each electrically conductive layer contains between 20% and 30% silver.

* * * * *